(12) United States Patent
Efimov

(10) Patent No.: US 7,406,225 B1
(45) Date of Patent: Jul. 29, 2008

(54) SYSTEM AND METHOD FOR RECORDING REFLECTION BRAGG GRATINGS

(75) Inventor: Oleg M. Efimov, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 11/636,285

(22) Filed: Dec. 7, 2006

(51) Int. Cl.
*G02B 6/34* (2006.01)

(52) U.S. Cl. .............................. 385/37; 385/15; 385/31

(58) Field of Classification Search .................. 385/15, 385/31, 37
See application file for complete search history.

(56) References Cited

U.S. PATENT DOCUMENTS 7,095,560 B2 *  8/2006  Toyoda et al. ................ 359/558

* cited by examiner

*Primary Examiner*—Jennifer Doan
(74) *Attorney, Agent, or Firm*—Christie, Parker & Hale

(57) ABSTRACT

A system and method for recording a reflection Bragg Grating in a photosensitive target. A photosensitive target is located between transmissive members on three sides. Beams incident on one of the transmissive members pass through the other two members before creating an interference within the photosensitive target. Either two transmissive members are used and the second member limits angular mobility of the first, or three members are used and the third member limits angular mobility of the other two. The target is coupled to the transmissive members through a transmissive liquid that has a refractive index similar to the refractive index of the target. Accordingly, angular deviations in the location of the target from the intended location or in the shape of the target only negligibly impact the interference pattern of the beams in the photosensitive target.

20 Claims, 5 Drawing Sheets

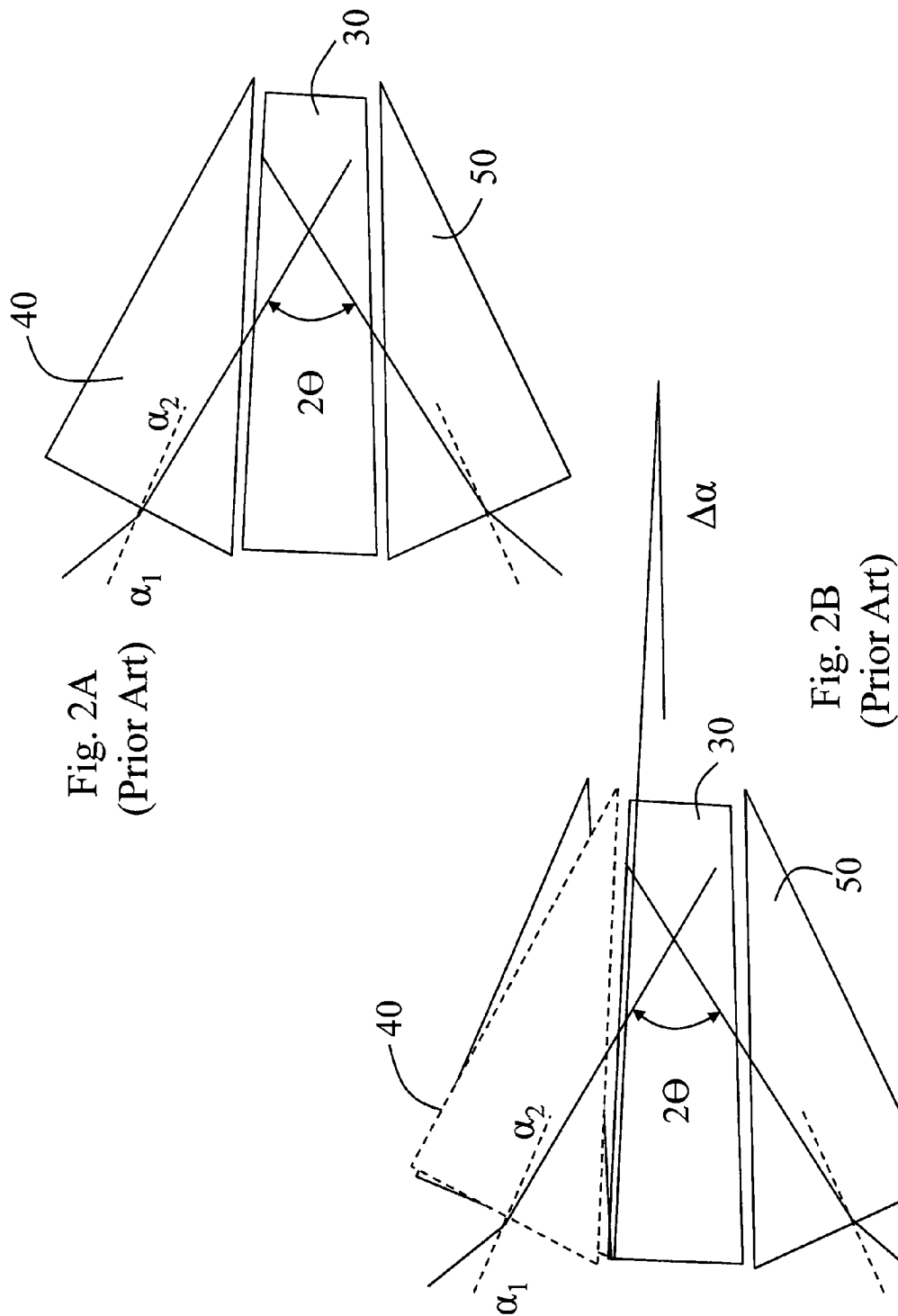

SYSTEM AND METHOD FOR RECORDING REFLECTION BRAGG GRATINGS

BACKGROUND OF THE INVENTION

1. Field of the Invention

This invention relates to optical filters developed through writing volume holographic gratings in photorefractive material and more particularly to recordation of reflection Bragg Gratings used as optical filters.

2. Description of Related Art

Reflection Bragg Gratings are volume gratings that are written by recording volume holograms created by the interference between two optical beams. Writing the volume holograms may be performed through transmission geometry or reflection geometry setups.

FIG. 1A shows a conventional reflection Bragg Grating recording system in transmission geometry and FIG. 1B shows a conventional reflection Bragg Grating recording system in reflection geometry. In transmission geometry, beams of light 1, 2 are incident on one side of a target 3 and the interference pattern of the two beams within the target 3 is recorded. In reflection geometry, beams of light 10, 20 are incident upon opposite sides of a target 30 and their interference pattern is recorded.

As shown in FIG. 1B, when recording the reflection Bragg Grating in reflection geometry, two optical beams 10, 20 are transmitted through opposite faces of a recording medium 30. The recording medium 30 may also be referred to as a target or a sample and it may be made from a material such as lithium niobate or photothermorefractive glass. The interference pattern caused by the two beams 10, 20 intersecting at the center of the recording medium 30 is recorded. Each beam 10, 20 enters the recording medium 30 at the same angle of incidence, interferes with the other beam 20, 10, and continues through the medium 30 to exit from the opposite face. The interference patterns are used to record the volume holograms within the medium 30.

Typical systems for recording Bragg Gratings, in either reflection or transmission geometries, include wavefront-splitting interferometers, phase-masks, or amplitude-splitting interferometers. The wavefront-splitting interferometer systems carve out two interfering beams from different areas of the wavefront of a spatially coherent beam. Such splitting, however, results in diffraction at the boundary of the cut, causing parasitic interference fringes. Further, additional beam expansion is necessary if large-sized gratings are to be recorded.

In phase-mask systems, a phase mask is illuminated by a single laser beam, creating interfering beams on a closely positioned target. Large-sized or thick gratings cannot be recorded with these systems.

In amplitude-splitting interferometer systems, which are the most common, two interfering beams are created by splitting a parent beam in two, and combining the two beams on a target in reflection or transmission geometry. When recording a Bragg Grating in reflection geometry with two counter propagating beams, the grating may only be reconstructed at a wavelength shorter than the wavelength used for recording. However, the spectral region of photosensitivity for holographic material is often smaller than the needed region of grating operation, making recording in reflection geometry difficult. For example, an spectral region of interest for laser and communication applications is 1000-2000 nm, and the photosensitivity regions of materials that are suitable for recording Bragg Gratings, such as lithium niobate and photothermorefractive glass, are 370-700 nm and 280-370 nm, respectively.

When the wavelengths corresponding to the photosensitive regions of the recording material are many times smaller than the wavelengths of interest for the Bragg Grating, the angles of incidence become too small to be practicable for use in reflection geometry. The relationship between the photosensitive wavelengths of the recording media, the wavelengths of interest and the angles of incidence is explained in an example below.

When a reflection Bragg Grating is recorded at a wavelength $\lambda_{IR}$ inside a material that at the wavelength $\lambda_{IR}$ has a refractive index $n_{IR}$, the period of the grating is equal to $\lambda_{IR}/(2n_{IR})$. To record such a grating with beams having a short wavelength $\lambda_{UV}$, the beams must propagate at an angle $2\theta$ with respect to each other in the media with a refractive index $n_{UV}$. As explained in H. Kogelnik, "Coupled wave theory for thick hologram gratings," The Bell System Technical Journal, v. 48, pp. 2909-2945, 1969, that is incorporated herein by reference, the angle $\theta$ can be found through the following relationship: $\sin\theta = (n_{IR}\lambda_{UV})/(n_{UV}\lambda_{IR})$. If the wavelengths $\lambda_{UV}$ and $\lambda_{IR}$ differ by a factor of 2 to 5, such that $\lambda_{IR}$ is between twice to five times $\lambda_{UV}$, the angle between the beams $2\theta$ will be less than 60°. This is too small of an angle for irradiation of the target from the lateral sides because under such an angle, the beams traveling in air cannot penetrate into the standard media with refractive indices of about 1.5. Using the spectral region of wavelengths in the range of 1000-2000 nm, and recording material of wavelengths in the range of 280-700 nm, the ratio of $\lambda_{UV}/\lambda_{IR}$ falls in the range 1.4 to 7 that yields angles between the incident beams that are too small to penetrate the recording medium from air.

When reflection Bragg Gratings for longer wavelengths such as those actually used in communication applications are required, using reflection geometry for the recording process becomes impracticable. As a result, these Bragg Gratings are written in transmission geometry while they are read in reflection geometry. However, the technique of writing a Bragg Grating in transmission geometry and reading it in reflection geometry has drawbacks of its own. Accordingly, recording in transmission geometry and reading in reflection geometry is not desirable.

One method for recording in reflection geometry despite the large difference between the wavelengths of the target medium and the desired wavelengths of the transmission medium is use of prisms as shown in FIG. 2A. The recording method shown in FIG. 2A counters the above problems by positioning a recording media, i.e. a target 30, between two prisms 40, 50, that are made of low-absorbing material such as fused silica, and connecting the target 30 to the prisms with a liquid with an index of refraction, or refractive index, similar to the index of refraction of the target. The beams 10, 20 propagate through the prisms 40, 50 without high absorption and reach the target 30 without unnecessary losses. This allows the recording of Bragg Gratings without the need for high quality polishing, and may sufficiently deflect the beams transmitted in the prisms 40, 50 and the target 30 such that the angle $2\theta$ between the beams 10, 20 in the target 30 is equal to the required angle while the beams are still capable of penetrating the target.

Usually, the accuracy of wavelength positioning needed for communication and laser techniques is about 0.1 nm. To achieve this level of accuracy in the wavelength, the angle between the incident beams 10, 20 must be accurately repeatable. The relationship between the accuracy of the wavelength and the accuracy of the angle $2\theta$ between the incident beams is explored below. If, for example, a reflection Bragg Grating is to be recorded at 1550 nm in photothermorefractive glass with a beam at 325 nm, the angle between the recording beams is found from $\sin\theta=(n_{IR}\lambda_{UV})/(n_{UV}\lambda_{IR})$ to be $2\theta=0.42$ radians, or approximately 24°. In this calculation $n_{IR} \sim n_{UV}$, and the small difference in refractive indices at different wavelengths is neglected. Differentiating this equation, one can find $\Delta\theta=-\tan\theta\cdot(\Delta\lambda_{IR}/\lambda_{IR})$. Using this equation, if at $\lambda_{IR}=1550$ nm the accuracy in the wavelength is $\Delta\lambda_{IR}=0.1$ nm, then $\Delta\lambda_{IR}/\lambda_{IR}=0.1/1550$ which yields a $\Delta\theta \sim 1.4\times10^{-5}$ radians. This means that the angle $2\theta$ between the angles between the beams should be repeatable with an accuracy of $\Delta\theta \sim 1.4\times10^{-5}$ radians or approximately 3" (seconds).

FIG. 2B shows the conventional reflection Bragg Grating recording system of FIG. 2A when there is an error in the position of the prisms. Any small error in the position of one or both of the prisms 40, 50 can change the beam directions and lower the reproducibility of the grating spatial frequency. For example, instead of having its intended rectangular cross section with perfectly parallel sides, the plate of the photorefractive glass that is used as the target 30 may have only substantially parallel sides with a deviation from the ideal or intended shape in the form of a wedge of approximately $\Delta\alpha$. This is equivalent to having a change of approximately $\Delta\alpha$ in the angular location of the prism 40 as shown in the dashed line of FIG. 2B. Therefore, the angle $\alpha_1$ of incidence of the beam on the surface of the prism 40, the angle $2\theta$ between the beams 10, 20, and the Bragg Grating frequency will also be changed.

The resultant change in the angle $2\theta$ between the beams can be determined through Snell's Law that applies to a beam propagating from a first medium with a refractive index $n_1$ into a second medium with a refractive index $n_2$. If the angle of incidence of the beam at the boundary between the first and second mediums from a normal to the boundary is $\alpha_1$ then, the angle $\alpha_2$ between the refracted beam in the second medium and normal is calculated from the relationship: $n_1 \sin\alpha_1 = n_2 \sin\alpha_2$. The amount by which the beam is deflected from its original path in the second medium is $\alpha_1 - \alpha_2$. When the prism constituting the second medium is moved from its original position by an angle $\Delta\alpha$, then the angles $\alpha_1$ and $\alpha_2$ will change by $\Delta\alpha_1$ and $\Delta\alpha_2$, respectively. The angles may change to $\alpha_1 - \Delta\alpha_1$ and $\alpha_2 - \Delta\alpha_2$ or to $\alpha_1 + \Delta\alpha_1$ and $\alpha_2 + \Delta\alpha_2$, but Snell's Law is preserved such that, for example, $n_1 \sin(\alpha_1 - \Delta\alpha_1) = n_2 \sin(\alpha_2 - \Delta\alpha_2)$. Differentiation of Snell's Law results in the following relationship:

$$\Delta\alpha_1 - \Delta\alpha_2 = \Delta\alpha_1[1 - [(n_1 \cos\alpha_1)/(n_2 \cos\alpha_2)]] \quad \text{(equation 1)}$$

This equation expresses the relationship of the difference $\Delta\alpha_1 - \Delta\alpha_2$ between the change $\Delta\alpha_1$, $\Delta\alpha_2$ in each of the angles of incidence and refraction from the normal at the prism boundary and the original value of the angles $\alpha_1$, $\alpha_2$. After crossing the boundary into the medium with the refractive index $n_2$, the angle of deviation of the beam from its original path in the medium with the refractive index $n_1$ is equal to $\alpha_1 - \alpha_2$. The change in the angle of incidence $\Delta\alpha_1$ results in a deviation of the refracted beam $\Delta\alpha_2$ and in a change of the total beam deviation $\Delta\alpha_1 - \Delta\alpha_2$.

As discussed above, to achieve a reproducibility of 0.1 nm, the change in the angle between the two beams is $\Delta\theta \sim 1.4\times\times10^{-5}$ radians. The amount $\Delta\theta$ is equal to $\Delta\alpha_1 - \Delta\alpha_2$. Assuming $n_1=1$ (air), $n_2=1.5$ (glass), $\alpha_1 \approx \alpha_2 \approx 0$, $\Delta\alpha_1 = \Delta\alpha$, and $\Delta\alpha^1 - \Delta\alpha_2 = 1.4\times10^{-5}$ radians, then it may be calculated from equation 1 that $\Delta\alpha \approx 4\times10^{-5}$ radians. The wedge tolerance $\Delta\alpha$ must therefore be less than $4\times10^{-5}$ radians or 8" (seconds) to provide above-mentioned reproducibility of Bragg Grating parameters. This would require special high quality preparation of the target 30 for Bragg Grating recording.

SUMMARY OF THE INVENTION

Embodiments of the present invention describe an optical set up and method for recording high-homogeneous reflection holographic gratings with an interfering pattern from two optical beams. Transmissive blocks or members are used to hold a sample, i.e. target or recording media, in place and they are designed to limit relative angular motion of the blocks and the sample with respect to one another. In addition, a special matching liquid cell is provided to improve a reproducibility of recorded grating parameters. The special matching liquid cell excludes the necessity of special preparation of the sample for recording of reflection Bragg Gratings. Antireflection coatings may be used between the blocks used for holding the sample in place.

Embodiments of the present invention provide a system for recording a Bragg Grating in a photosensitive target. The target has a first side and a second side opposite the first side and substantially parallel to the first side. The system includes first and second transmissive members that have limited angular mobility with respect to one another. The first transmissive member is located proximate to the first side of the photosensitive target. The second transmissive member is located proximate to the second side of the photosensitive target and proximate to the first transmissive member. A transmissive substance is included between the photosensitive target and the first transmissive member and between the photosensitive target and the second transmissive member. The second transmissive member limits angular mobility of the first transmissive member.

Embodiments of the present invention also provide a system for recording a Bragg Grating in a photosensitive target. The target has a first side and a second side opposite the first side and substantially parallel to the first side. The system includes first, second and third transmissive members. The third transmissive member limits angular motion of the other two. The first transmissive member is located proximate to the first side of the photosensitive target. The second transmissive member is located proximate to the second side of the photosensitive target. The third transmissive member is located proximate to the first transmissive member and the second transmissive member. A transmissive substance is included between the photosensitive target and the first transmissive member and between the photosensitive target and the second transmissive member. The third transmissive member limits angular mobility of the first transmissive member and the second transmissive member.

Embodiments of the present invention also provide a method for creating a Bragg Grating in a target. The target has a first side opposite a second side. The method includes positioning first and second transmissive members next to the target, limiting the angular mobility of these transmissive members, and radiating beams of light onto the target. The first transmissive member is positioned proximate to the first side of the target. The second transmissive member is positioned proximate to the second side of the target. A transmissive substance is positioned between the target and the first transmissive member and between the target and the second transmissive member. The angular mobility of the first transmissive member and the second transmissive member is limited. A first beam of light and a second beam of light are radiated toward the target such that the first beam of light enters the first side and the second beam of light enters the second side of the target. The target is a photosensitive medium.

BRIEF DESCRIPTION OF THE DRAWINGS

FIG. 2A is a schematic diagram of a conventional reflection Bragg Grating recording system including lateral prisms.

FIG. 2B is a schematic diagram of a conventional reflection Bragg Grating recording system including lateral prisms when there is an error in the position of the prisms.

DETAILED DESCRIPTION

Figure 1B:
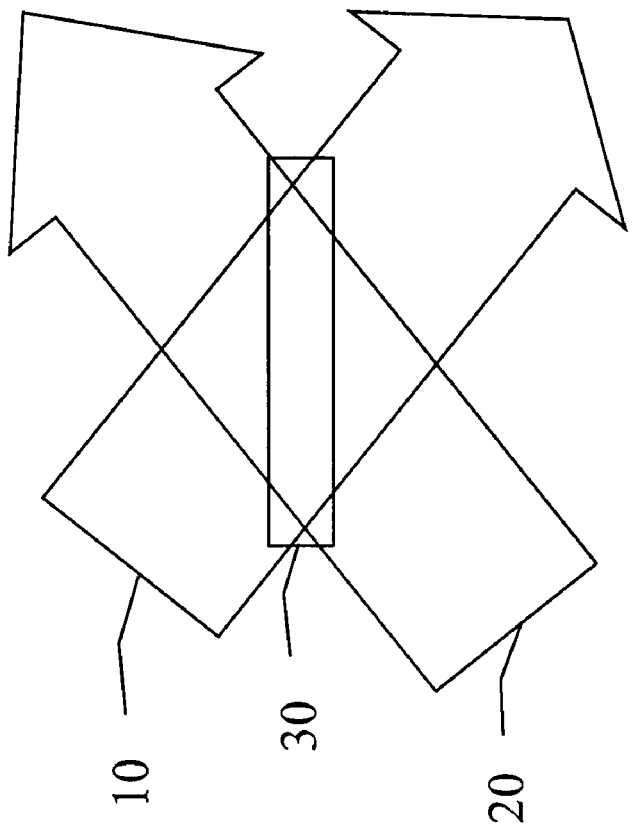
FIG. 1B is a schematic diagram of a conventional reflection Bragg Grating recording system in reflection geometry.
Figure 1A:
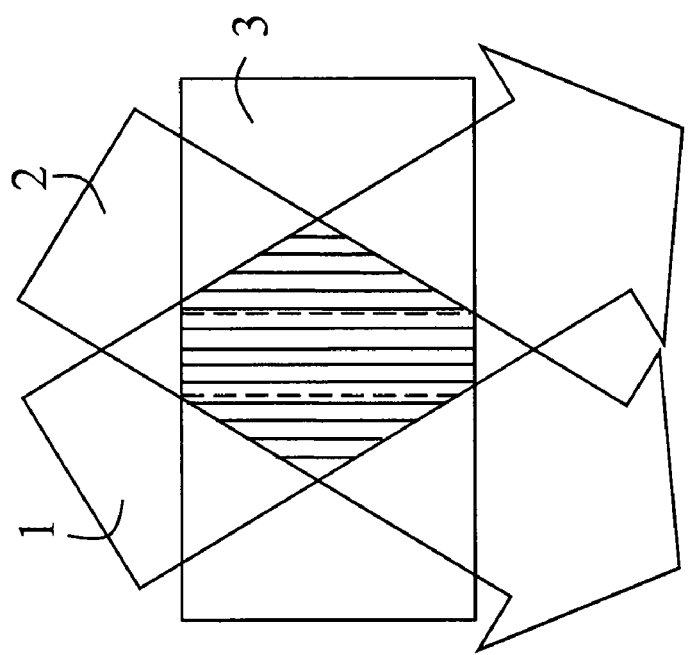
FIG. 1A is a schematic diagram of a conventional reflection Bragg Grating recording system in transmission geometry.
Figure 3:
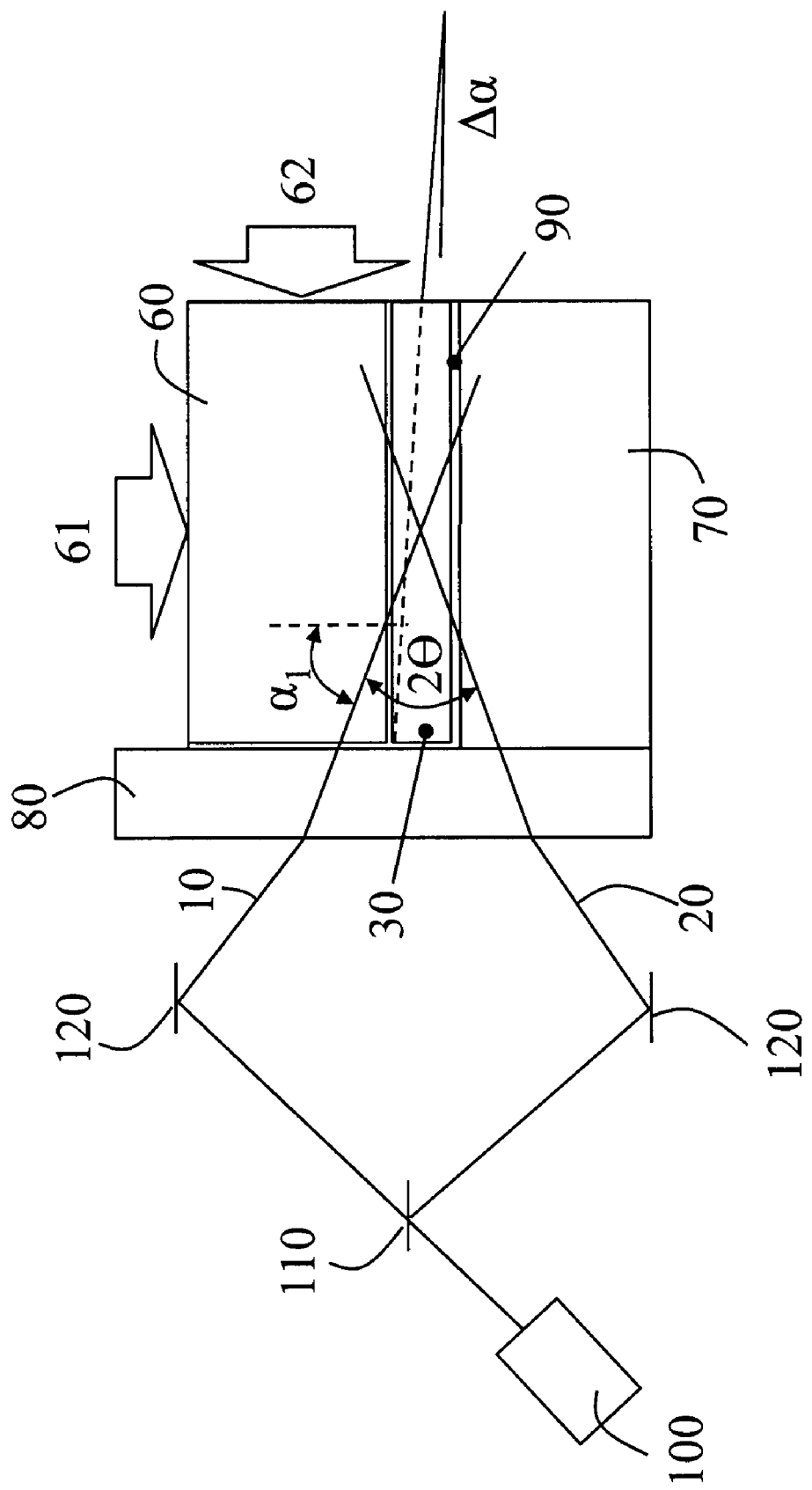
FIG. 3 is a schematic plan view of one embodiment of a reflection Bragg Grating recording system according to the invention.
Figure 4A:
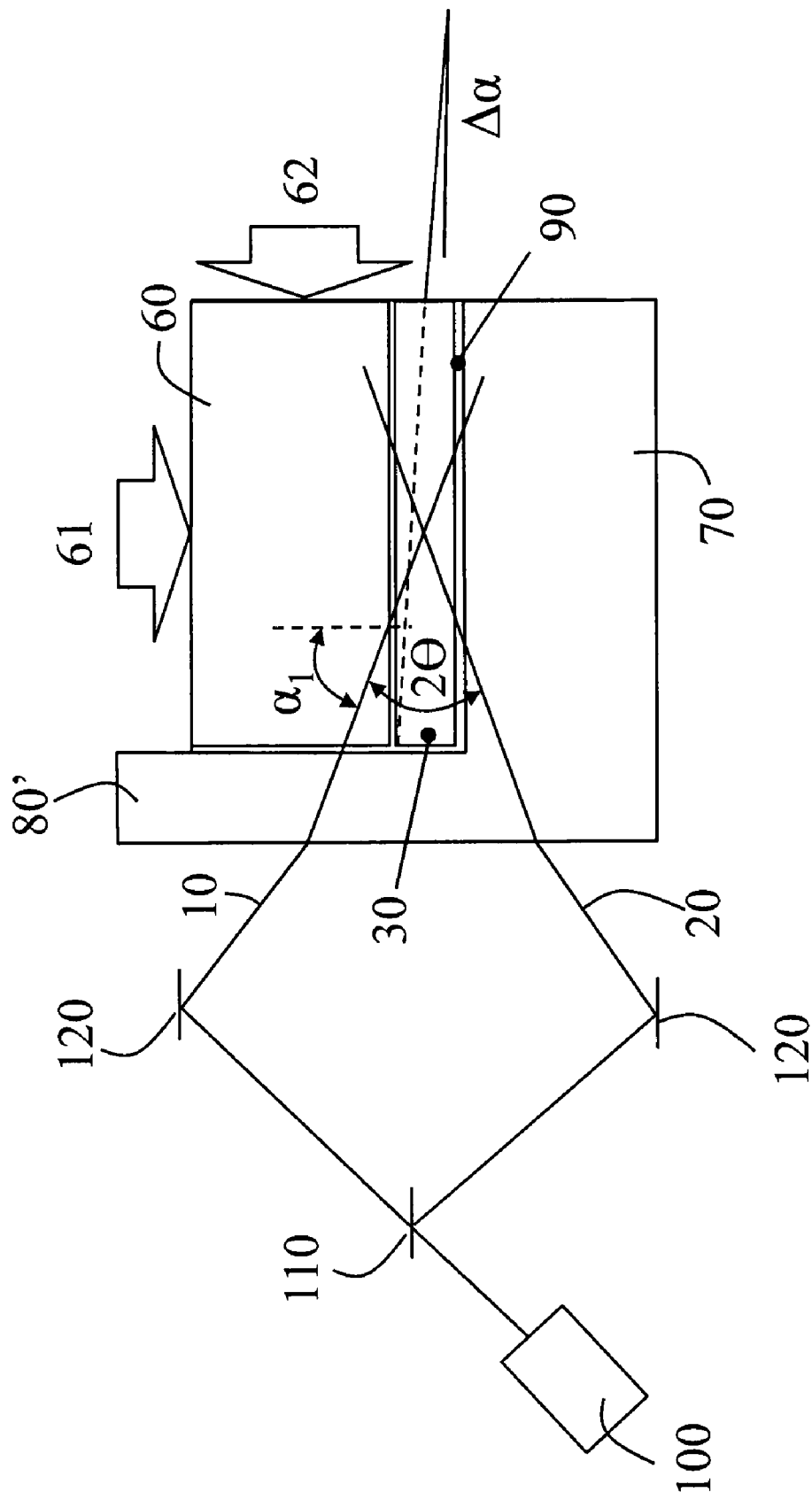
FIG. 4A is a schematic plan view of another embodiment of a reflection Bragg Grating recording system according to the invention.
Figure 4B:
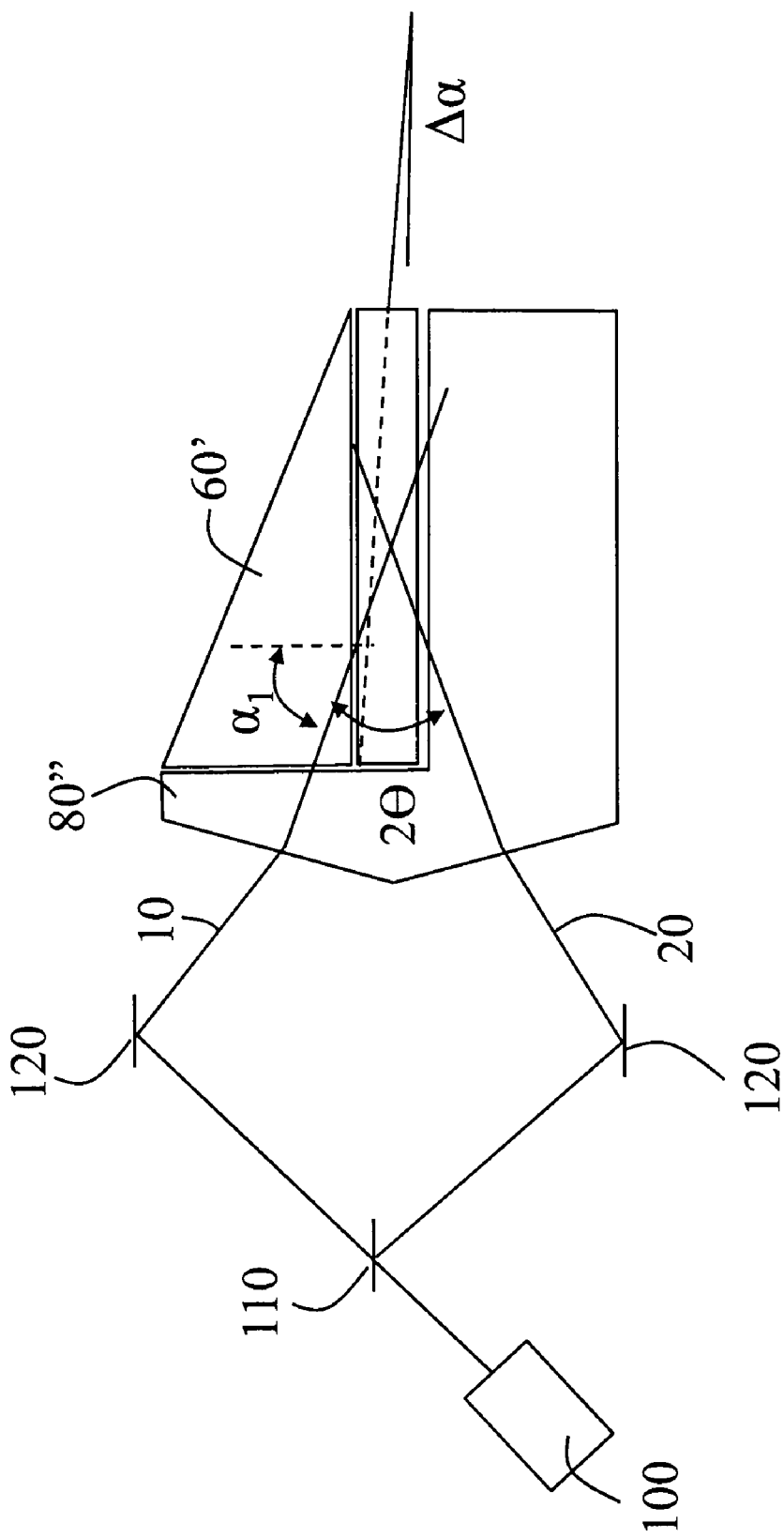
FIG. 4B is a schematic plan view of a further embodiment of a reflection Bragg Grating recording system according to the invention.

FIG. 3 shows a plan view of one embodiment of a system for recording a Bragg Grating in a photosensitive target 30. FIG. 4A and FIG. 4B show two alternative embodiments. In FIG. 3, the target 30 is surrounded on three of its sides by a first transmissive member 60, a second transmissive member 70, and a third transmissive member 80. In this embodiment, the transmissive members 60, 70, 80 are made from a non-photosensitive high transparent material, such as fused silica. However, any other suitable transmissive material may also be used. The second and third transmissive members 70, 80 are fixed to each other by, for example glue, and project in different directions around the target 30.

The second and third transmissive members may also be unfixed relative to each other. Even when none of the first, second, and third transmissive members are fixed with respect to one another, the positioning of the third transmissive member 80 is such that it restricts any rotation or angular movement by the first and second transmissive members 60, 70. All of the members may rotate together, however, the type of angular deviation shown in FIG. 2B is limited by the placement of the third transmissive member 80.

Alternatively, as shown in FIG. 4A and FIG. 4B, the second and third transmissive members may be portions of the same piece of material 80', 80". In the following description, pieces 80' and 80" may be used instead of a combination of second and third transmissive members 70, 80 when appropriate. A mention to these pieces is often omitted.

In one embodiment, a transmissive substance 90 is inserted between each of the transmissive members 60, 70 and the target 30. The transmissive substance may also be included between the first transmissive member 60 and the third transmissive member 80. Alternatively, the boundary between the third transmissive element 80 and the target 30 may be covered with a non-transmissive substance to block passage of parasitic light through.

The transmissive substance 90 has a refractive index that is close to the refractive index of the target 30 and/or to the refractive indices of transmissive members 60, 70, 80. In one embodiment, the refractive index of the transmissive substance 90 is the same as or similar to the refractive index of the target 30. In one embodiment, the transmissive substance 90 used between the transmissive members 60, 70, 80 may also function as a glue to fix these elements relative to each other.

The transmissive substance used between the target 30 and the first, second and third transmissive elements, 60, 70, 80 may be a liquid or a gel. A matching liquid is one example of the transmissive substance 90. A matching liquid is a liquid whose refractive index may match the refractive index of an adjacent transmissive member, or the refractive index of the target, or both. Alternatively, air may be used as the transmissive substance 90.

When liquid or gel is used as the transmissive substance 90, it may be prone to motions that cause error during long recording sessions. As indicated by arrows 61, 62 in FIG. 3 and FIG. 4A the first transmissive member 60 may be pressed against the third transmissive member 80 (80') and the target 30 to minimize the thickness of the transmissive substance 90 between the transmissive members 60, 70, 80 and the target 30 that is prone to causing errors.

As explained above, the target or sample 30 is intended to have a rectangular cross section that fits in the space between the transmissive members 60, 70. However, an ideal and perfectly rectangular shape is generally a mere mathematical notion. Real samples have deviations from the ideal shape that are introduced during the processing of the sample. So, in reality the samples 30 include small wedges along their sides causing a deviation from a perfectly parallel state for the sides. In short, the sides of the target 30 are substantially parallel rather than being perfectly parallel. Standard samples of higher quality, that have substantially parallel sides, may have wedges of about 5 minutes. As demonstrated above, this deviation from having perfectly parallel sides impairs the reproducibility of the grating parameters such as spatial frequency. If the deviation from parallel or the wedge of the sample 30, is less than 8 seconds or approximately 40 times smaller than a 5 minute wedge that appears in most standard samples, the grating's spatial frequency may be reproduced with greater accuracy. While development of samples with a wedge of approximately 8 seconds is possible, samples processed with this level of accuracy are more expensive. The embodiments of the present invention, however, allow using samples or targets that are processed using standard methods and include wedges along their sides that make the sides deviate from a perfectly parallel state. The embodiments of the present invention also apply to samples including other types of imperfections that may be inherent or may result during the processing of the sample. The embodiments of the present invention also apply to a highly processed sample with perfectly parallel sides. Different aspects of the invention, such as the use of the matching liquid, or fixing the prisms and transmissive members to limit their angular mobility and the various arrangements presented for various embodiments of the present invention are applicable for any quality of sample.

When a matching liquid is used for the transmissive substance 90, the embodiment shown in FIG. 3 is one example of a matching liquid cell which excludes the necessity of special sample preparation for reflection Bragg Gratings recording in transmission geometry. The directions of recording beam refractions are fixed using the plate that receives the incident beams and is made from a highly transparent and non-photosensitive material (e.g., fused silica). The other analogous plates surround the target or sample, that is in turn a plate of photosensitive material. All the plates and the target attach to each other with a matching liquid to exclude total reflection of the incident beams on the boundaries between the plates. The surfaces of plates where the beams cross have to have a relatively high quality to reduce beam distortions at the boundaries between the plates and between the plates and the target. The matching liquid should have a refractive index close to the refractive index of target while the refractive indices of the other plates may differ from it. Under these conditions, the incident beams will not experience substantial distortions on the boundaries even if the surface of the target does not have a very high quality.

As shown in FIG. 3, a beam emitter 100 emits a beam of light which is split into two split beams 10, 20 by a beam splitter 110 and reflected by reflecting elements 120 toward the third transmissive member 80. However, any optical arrangement resulting in two split beams propagating toward the third transmissive member 80 may be used. The beams 10, 20 are transmitted through the third transmissive member 80 and are refracted according to their angles of incidence and the index of refraction of the third transmissive member 80. Because the third transmissive member 80 is highly transparent and non-photosensitive, the beams 10, 20 continue through the third transmissive member 80 with few losses. To minimize the losses and exclude re-reflections resulting in parasitic grating recording, the surfaces of transmitting members may have antireflection coatings or the transmissive substance may also be inserted between the transmissive members 60, 70, and the transmissive member 80. The first beam 10 proceeds through the transmissive substance 90 and into the first transmissive member 60. The first transmissive member 60 is pressed against the third transmissive member 80 and the target 30 to minimize the thickness of transmissive substance in between the two transmissive members.

The first beam 10 then proceeds through the first transmissive member 60, through the transmissive substance 90, and into a side of the target 30. Total reflection of the first beam 10 on the boundary between the first transmissive member 60 and the target 30 is prevented due to the transmissive substance 90. The transmissive substance 90 may have a similar index of refraction as the target 30 and is pressed against it, so the side of the target 30 need not have a high surface quality to avoid beam distortions at its boundary. A deviation such as that shown in FIG. 2B, in the sample or target is compensated by the matching liquid. The beam 10 continues to an interference region within the target 30.

The second beam 20 enters the third transmissive member 80 and experiences the same refraction as described above in relation to the first beam 10. The second beam 20 then enters the second transmissive member 70 which is fixed to the third transmissive member 80. Because the second and third transmissive members 70, 80 are fixed relative to each other, and the first transmissive member 60 is pressed against the third transmissive member 80, the system of FIG. 3 is better stabilized than the prior art system of FIG. 2A and FIG. 2B, allowing for less relative movement.

The second beam 20 is transmitted through the transmissive substance 90, and continues through a second and opposite side of the target 30 to interfere with the first beam in the interference region within the target 30. The interference is then recorded in the photosensitive target 30 to create a reflection Bragg Grating.

FIG. 4A and FIG. 4B show other embodiments of a system for recording reflection Bragg Gratings. In these drawings, only the one combined transmissive member 80', 80" is used instead of the second and third transmissive members 70, 80 of FIG. 3. The shape of the combined transmissive member 80' of FIG. 4A is different from the shape of the combined transmissive member 80" of FIG. 4B. Further, the shape of the first transmissive element 60 of FIG. 3 and FIG. 4A is different from the shape of the first transmissive member 60' of FIG. 4B. In various embodiments, any of the transmissive members can have a shape different from the shapes shown in FIGS. 3, 4A, 4B as long as the underlying principles set forth in this specification are followed. Further, although the second and third transmissive members 70, 80 are fixed to or integral with each other in the embodiments shown in FIG. 3 and FIGS. 4A and 4B, it is also within the scope of the invention for the members to be fixed relative to each other through some intervening element or pressed against each other through the transmissive substance in a similar fashion as the first and third transmissive members. In an alternative embodiment, neither the first transmissive member nor the second transmissive member is pressed against the target or the third transmissive member.

If the position of the target is offset from its intended position, the only boundary where either beam 10, 20 experiences the offset is in the boundary between the target 30 and the transmissive substance 90. For example, if the target is offset by a wedge $\Delta\alpha$ from its intended angle, as indicated by the dashed line, beam 10 experiences the offset at the boundary between the target 30 and the transmissive substance 90. If the refractive indices of the transmissive substance 90 and the target 30 are similar, the wedge offset will change the angle between the beams 10, 20 negligibly. As explained above, the refractive index of the transmissive substance 90 can be matched to the refractive index of the target 30 with the accuracy of about $10^{-4}$. This will cause the angle between the beams 10 and 20 to change only slightly.

If the refractive index of the glass is $n_2=1.5$ and the refractive index of the transmissive substance differs from the index of glass by $10^{-4}$ or $n_1=1.4999$, $\alpha_1 \approx (\pi/2)-\theta$, $\Delta\alpha_1=\Delta\alpha$, and $\Delta\alpha_1-\Delta\alpha_2=\Delta\theta=1.4\times10^{-5}$, equation 1 reduces to the following equation 2:

$$\Delta\alpha_1 - \Delta\alpha_2 = \Delta\alpha_1 \left(1 - \frac{n_1}{n_2}\sqrt{\frac{1-\sin^2\alpha_1}{1-\left(\frac{n_1}{n_2}\right)^2\sin^2\alpha_1}}\right) \quad \text{(equation 2)}$$

The total beam deviation in the embodiments shown in FIG. 3, FIG. 4A, and FIG. 4B can be expressed by equation 2. From equation 2, it can be calculated that the wedge tolerance is $\Delta\alpha \approx 9\times10^{-3}$ radians or 30' (minutes). This value is more than 200 times larger than that of the embodiment of FIG. 2B and is much larger than a standard wedge tolerance for optical plate treatment.

Thus, the embodiments shown in FIGS. 3, 4A, and 4B can reduce quality requirements of the photosensitive target plates and provide a system and a method for repeatable recording of large sized well-characterized reflection Bragg Grating.

The invention has been described and illustrated by exemplary embodiments, but is not limited thereto. Persons skilled in the art will appreciate that a number of modifications can be made without departing from the scope of the invention, which is limited only by the appended claims and their equivalents.

What is claimed is:

1. A system for recording a Bragg Grating in a photosensitive target having a first side and a second side opposite the first side and substantially parallel to the first side, the system comprising:

a first transmissive member located proximate to the first side of the photosensitive target;

a second transmissive member located proximate to the second side of the photosensitive target and proximate to the first transmissive member; and a transmissive substance located between the photosensitive target and the first transmissive member and between the photosensitive target and the second transmissive member, wherein the second transmissive member limits angular mobility of the first transmissive member.

2. The system of claim 1, wherein the first transmissive member is in pressed engagement with the transmissive substance.

3. The system of claim 1, wherein an index of refraction of the transmissive substance is similar to an index of refraction of the photosensitive target and/or the first transmissive member and the second transmissive member.

4. A system for recording a Bragg Grating in a photosensitive target having a first side and a second side opposite the first side and substantially parallel to the first side, the system comprising:

a first transmissive member located proximate to the first side of the photosensitive target;

a second transmissive member located proximate to the second side of the photosensitive target;

a third transmissive member located proximate to the first transmissive member and the second transmissive member; and a transmissive substance located between the photosensitive target and the first transmissive member and between the photosensitive target and the second transmissive member, wherein the third transmissive member limits angular mobility of the first transmissive member and the second transmissive member.

5. The system of claim 4, wherein the second transmissive member is fixed to the third transmissive member.

6. The system of claim 4, wherein the first transmissive member, the second transmissive member, and the third transmissive member have respective indices of refraction that are substantially the same.

7. The system of claim 4, wherein proximate surfaces of the first transmissive member, the second transmissive member, and the third transmissive member include antireflection coating.

8. The system of claim 4, wherein at least one of the first transmissive member, the second transmissive member, and the third transmissive member is non-photosensitive or transparent.

9. The system of claim 4, wherein the at least one of the first transmissive member, the second transmissive member, and the third transmissive member is fused silica.

10. The system of claim 4, further comprising:

a beam emitter for emitting a beam of light for transmission toward the photosensitive target; and a beam splitter for receiving and splitting the beam of light into a first split beam and a second split beam, wherein the third transmissive member is positioned to provide a path for the first split beam and the second split beam toward the photosensitive target.

11. The system of claim 10, wherein the third transmissive member is positioned to provide a first path for the first split beam toward the first side of the photosensitive target and a second path for the second split beam toward the second side of the photosensitive target.

12. The system of claim 4, wherein the transmissive substance is located between the third transmissive member and the first transmissive member and between the third transmissive member and the second transmissive member.

13. The system of claim 4, wherein the first transmissive member is in pressed engagement with the transmissive substance.

14. The system of claim 4, wherein an index of refraction of the transmissive substance is similar to an index of refraction of the photosensitive target and/or the first transmissive member and the second transmissive member.

15. The system of claim 4, wherein the transmissive substance is a matching liquid.

16. A method for creating a Bragg Grating in a target having a first side opposite a second side, the method comprising:

positioning a first transmissive member proximate to the first side of the target;

positioning a second transmissive member proximate to the second side of the target;

positioning a transmissive substance between the target and the first transmissive member and between the target and the second transmissive member;

limiting an angular mobility of the first transmissive member and the second transmissive member; and radiating a first beam of light and a second beam of light toward the target such that the first beam of light enters the first side and the second beam of light enters the second side of the target, wherein the target is a photosensitive medium.

17. The method of claim 16, wherein the limiting an angular mobility of the first transmissive member and the second transmissive member includes positioning the second transmissive member proximate to the first transmissive member.

18. The method of claim 16, wherein the limiting an angular mobility of the first transmissive member and the second transmissive member includes positioning a third transmissive member proximate to the first transmissive member and the second transmissive member.

19. The method of claim 16, further comprising positioning a nontransmissive substance between the target and the third transmissive member.

20. The method of claim 16, further comprising pressing the first transmissive member toward the transmissive substance.

* * * * *